United States Patent
Cao et al.

(10) Patent No.: US 10,614,282 B2
(45) Date of Patent: Apr. 7, 2020

(54) PRESSURE SENSING ASSEMBLY INTEGRATED WITH FINGERPRINT IDENTIFICATION FUNCTION, DRIVING METHOD THEREOF, AND DISPLAY DEVICE

(71) Applicant: BOE TECHNOLOGY GROUP CO., LTD., Beijing (CN)

(72) Inventors: Xueyou Cao, Beijing (CN); Haisheng Wang, Beijing (CN); Xiaoliang Ding, Beijing (CN); Rui Xu, Beijing (CN); Chihjen Cheng, Beijing (CN); Yanling Han, Beijing (CN); Wei Liu, Beijing (CN); Ping Zhang, Beijing (CN); Yuzhen Guo, Beijing (CN); Chao Wu, Beijing (CN); Peiyu Yu, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 15/933,139

(22) Filed: Mar. 22, 2018

(65) Prior Publication Data
US 2019/0065811 A1 Feb. 28, 2019

(30) Foreign Application Priority Data
Aug. 31, 2017 (CN) .......................... 2017 1 0772900

(51) Int. Cl.
*G06K 9/00* (2006.01)
*G06F 3/041* (2006.01)

(52) U.S. Cl.
CPC ......... *G06K 9/0004* (2013.01); *G06F 3/0414* (2013.01)

(58) Field of Classification Search
None
See application file for complete search history.

(56) References Cited

U.S. PATENT DOCUMENTS

2006/0217915 A1* 9/2006 Dinh .................... G06K 9/0002
702/116
2012/0321149 A1* 12/2012 Carver ................. G06K 9/0004
382/124
(Continued)

FOREIGN PATENT DOCUMENTS

CN 104978575 A * 10/2015
CN 105738016 A 7/2016
(Continued)

OTHER PUBLICATIONS

First Chinese Office Action dated Nov. 5, 2019, received for corresponding Chinese Application No. 201710772900.1, 14 pages.

*Primary Examiner* — Delomia L Gilliard
(74) *Attorney, Agent, or Firm* — Kinney & Lange, P.A.

(57) ABSTRACT

A pressure sensing assembly integrated with a fingerprint identification function includes a pressure sensing unit and a control unit. The pressure sensing unit includes a plurality of pressure sensing sub-units arranged in N rows and M columns, a pressure sensing processing sub-unit, and a fingerprint identification processing sub-unit, where N and M are each a positive integer. A pressure sensing sub-unit in an $n^{th}$ row and an $m^{th}$ column includes a pressure sensing module in the $n^{th}$ row and the $m^{th}$ column and a fingerprint identification module in the $n^{th}$ row and the $m^{th}$ column. The pressure sensing processing sub-unit and the fingerprint identification module in the $n^{th}$ row and the $m^{th}$ column are connected to the control unit, where n is a positive integer smaller than or equal to N, and m is a positive integer smaller than or equal to M. The control unit is configured to, upon the receipt of a pressure sensing indication signal, transmit a fingerprint identification control signal to the fingerprint identification module in the $n^{th}$ row and the $m^{th}$ column.

17 Claims, 3 Drawing Sheets

(56) References Cited

U.S. PATENT DOCUMENTS

| | | | |
|---|---|---|---|
| 2018/0189538 A1* | 7/2018 | He | G06K 9/0002 |
| 2018/0260599 A1* | 9/2018 | Chen | G06K 9/0002 |
| 2019/0012518 A1* | 1/2019 | Yang | G06F 3/0416 |
| 2019/0066124 A1* | 2/2019 | Vildosola | H04L 67/1095 |

FOREIGN PATENT DOCUMENTS

| | | | | |
|---|---|---|---|---|
| CN | 105930698 A | | 9/2016 | |
| CN | 106022292 A | * | 10/2016 | G02F 1/0105 |
| CN | 106529463 A | * | 3/2017 | G09G 3/3208 |
| CN | 106778616 A | | 5/2017 | |
| WO | WO-2018218670 A1 | * | 12/2018 | H01L 23/49811 |

* cited by examiner

PRESSURE SENSING ASSEMBLY INTEGRATED WITH FINGERPRINT IDENTIFICATION FUNCTION, DRIVING METHOD THEREOF, AND DISPLAY DEVICE

CROSS-REFERENCE TO RELATED APPLICATION

The present application claims a priority of the Chinese patent application No. 201710772900.1 filed on Aug. 31, 2017, which is incorporated herein by reference in its entirety.

TECHNICAL FIELD

The present disclosure relates to the field of touch technology, in particular to a pressure sensing assembly integrated with a fingerprint identification function, a driving method thereof and a display device.

BACKGROUND

In the related art, there have already existed some schemes for integrating an optical fingerprint identification function into a display device. In the case that a fingerprint identification module is integrated into the display device which displays an image in a full-screen manner, the fingerprint identification module may be triggered erroneously. For example, in the case that the image is being displayed on a screen normally but the fingerprint identification module is still working, the power consumption may increase. At this time, an unnecessary noise may occur due to such factors as circuit coupling, and thereby a display effect may be adversely affected.

SUMMARY

In one aspect, the present disclosure provides in some embodiments a pressure sensing assembly integrated with a fingerprint identification function, including a pressure sensing unit and a control unit. The pressure sensing unit includes a plurality of pressure sensing sub-units arranged in N rows and M columns, a pressure sensing processing sub-unit, and a fingerprint identification processing sub-unit, where N and M are each a positive integer. A pressure sensing sub-unit in an $n^{th}$ row and an $m^{th}$ column includes a pressure sensing module in the $n^{th}$ row and the $m^{th}$ column and a fingerprint identification module in the $n^{th}$ row and the $m^{th}$ column. The pressure sensing processing sub-unit and the fingerprint identification module in the $n^{th}$ row and the $m^{th}$ column are connected to the control unit, where n is a positive integer smaller than or equal to N, and m is a positive integer smaller than or equal to M. The pressure sensing module in the $n^{th}$ row and the $m^{th}$ column is configured to output a pressure sensing electrical signal corresponding to a pressure applied thereto. The pressure sensing processing sub-unit is configured to, in the case that it is detected in accordance with the pressure sensing electrical signal that the pressure sensing module in the $n^{th}$ row and the $m^{th}$ column has been pressed, output a pressure sensing indication signal to the control unit. The control unit is configured to, upon the receipt of the pressure sensing indication signal, transmit a fingerprint identification control signal to the fingerprint identification module in the $n^{th}$ row and the $m^{th}$ column. The fingerprint identification module in the $n^{th}$ row and the $m^{th}$ column is configured to, upon the receipt of the fingerprint identification control signal, convert a received optical signal into a corresponding fingerprint identification electrical signal. The fingerprint identification processing sub-unit is configured to perform fingerprint identification in accordance with the fingerprint identification electrical signal.

In a possible embodiment of the present disclosure, the pressure sensing assembly further includes a plurality of pressure sensing gate lines arranged in N rows and a plurality of pressure sensing read lines arranged in M columns. The pressure sensing read lines in M columns are connected to the pressure sensing processing sub-unit. Pressure sensing modules in the $n^{th}$ row are connected to an $n^{th}$ pressure sensing gate line, and pressure sensing modules in the $m^{th}$ column are connected to an $m^{th}$ pressure sensing read line. The pressure sensing module in the $n^{th}$ row and the $m^{th}$ column includes a pressure sensing sub-module in the $n^{th}$ row and the $m^{th}$ column and a pressure sensing switching sub-module in the $n^{th}$ row and the $m^{th}$ column. A control end of the pressure sensing switching sub-module in the $n^{th}$ row and the $m^{th}$ column is connected to the $n^{th}$ pressure sensing gate line, a first end thereof is connected to a pressure sensing electrical signal output end of the pressure sensing sub-module in the $n^{th}$ row and the $m^{th}$ column, and a second end thereof is connected to the $m^{th}$ pressure sensing read line. The pressure sensing sub-module in the $n^{th}$ row and the $m^{th}$ column is configured to convert a pressure applied thereto into a corresponding pressure sensing electrical signal. The pressure sensing switching sub-module in the $n^{th}$ row and the $m^{th}$ column is configured to control whether or not the pressure sensing electrical signal output end of the pressure sensing sub-module in the $n^{th}$ row and the $m^{th}$ column is to be connected to the $m^{th}$ pressure sensing read line under the control of the $n^{th}$ pressure sensing gate line.

In a possible embodiment of the present disclosure, the pressure sensing sub-module in the $n^{th}$ row and the $m^{th}$ column includes a first electrode, a second electrode and a pressure sensing layer arranged between the first electrode and the second electrode. The first electrode is connected to a first level input end. The first end of the pressure sensing sub-module in the $n^{th}$ row and the $m^{th}$ column is connected to the second electrode.

In a possible embodiment of the present disclosure, the pressure sensing switching sub-module in the $n^{th}$ row and the $m^{th}$ column includes a pressure sensing switching transistor in the $n^{th}$ row and the $m^{th}$ column, a gate electrode of which is connected to the $n^{th}$ pressure sensing gate line, a first electrode of which is connected to the second electrode, and a second electrode of which is connected to the $m^{th}$ pressure sensing read line.

In a possible embodiment of the present disclosure, the pressure sensing layer includes a pressure resistance sensing layer, and the second electrode is further connected to a second level input end.

In a possible embodiment of the present disclosure, the pressure sensing module in the $n^{th}$ row and the $m^{th}$ column further includes a resistor sub-module in the $n^{th}$ row and the $m^{th}$ column, the second electrode of the pressure sensing sub-module in the $n^{th}$ row and the $m^{th}$ column is connected to the second level input end via the resistor sub-module in the $n^{th}$ row and the $m^{th}$ column, and the resistor sub-module in the $n^{th}$ row and the $m^{th}$ column has a constant resistance.

In a possible embodiment of the present disclosure, the resistor sub-module in the $n^{th}$ row and the $m^{th}$ column includes a normally-ON transistor in the $n^{th}$ row and the $m^{th}$ column, a gate electrode of which is connected to a first voltage input end, a first electrode of which is connected to the second electrode of the pressure sensing sub-module in the $n^{th}$ row and the $m^{th}$ column, and a second electrode of which is connected to the second level input end.

In a possible embodiment of the present disclosure, the pressure sensing layer includes a piezoelectric sensing layer.

In a possible embodiment of the present disclosure, the fingerprint identification module in the $n^{th}$ row and the $m^{th}$ column includes a photosensitive element in the $n^{th}$ row and the $m^{th}$ column and a fingerprint identification switching sub-module in the $n^{th}$ row and the $m^{th}$ column. The photosensitive element in the $n^{th}$ row and the $m^{th}$ column is configured to convert the received optical signal into the corresponding fingerprint identification electrical signal. A control end of the fingerprint identification switching sub-module in the $n^{th}$ row and the $m^{th}$ column is connected to a fingerprint identification control signal output end of the control unit, a first end thereof is connected to a fingerprint identification electrical signal output end of the photosensitive element in the $n^{th}$ row and the $m^{th}$ column, and a second end thereof is connected to the fingerprint identification processing sub-unit. The fingerprint identification switching sub-module in the $n^{th}$ row and the $m^{th}$ column is configured to, in the case that its control end has received the pressure sensing indication signal from the control unit, control the fingerprint identification electrical signal output end of the photosensitive element in the $n^{th}$ row and the $m^{th}$ column to be connected to the fingerprint identification processing sub-unit.

In a possible embodiment of the present disclosure, the fingerprint identification switching sub-module in the $n^{th}$ row and the $m^{th}$ column includes a fingerprint identification switching transistor in the $n^{th}$ row and the $m^{th}$ column, a gate electrode of which is connected to the pressure sensing indication signal output end of the control unit, a first electrode of which is connected to the fingerprint identification electrical signal output end of the photosensitive element in the $n^{th}$ row and the $m^{th}$ column, and a second electrode of which is connected to the fingerprint identification processing sub-unit.

In another aspect, the present disclosure provides in some embodiments a method for driving the above-mentioned pressure sensing assembly integrated with the fingerprint identification function, including steps of: outputting, by the pressure sensing module in the $n^{th}$ row and the $m^{th}$ column, a pressure sensing electrical signal corresponding to a pressure applied thereto to the pressure sensing processing sub-unit; in the case that the pressure sensing processing sub-unit has detected in accordance with the pressure sensing electrical signal that the pressure sensing module in the $n^{th}$ row and the $m^{th}$ column has been pressed, outputting, by the pressure sensing processing sub-unit, a pressure sensing indication signal to the control unit; upon the receipt of the pressure sensing indication signal, transmitting, by the control unit, a fingerprint identification control signal to the fingerprint identification module in the $n^{th}$ row and the $m^{th}$ column; upon the receipt of the fingerprint identification control signal, converting, by the fingerprint identification module in the $n^{th}$ row and the $m^{th}$ column, a received optical signal into a corresponding fingerprint identification electrical signal, and transmitting the fingerprint identification electrical signal to the fingerprint identification processing sub-unit; and performing, by the fingerprint identification processing sub-unit, fingerprint identification in accordance with the fingerprint identification electrical signal.

In yet another aspect, the present disclosure provides in some embodiments a display device including the above-mentioned pressure sensing assembly integrated with the fingerprint identification function.

In a possible embodiment of the present disclosure, the display device further includes a display substrate and a driving Integrated Circuit (IC). The pressure sensing sub-units in N rows and M columns of the pressure sensing unit of the pressure sensing assembly are arranged in the display substrate, where N and M are each a positive integer. The control unit, the pressure sensing processing sub-unit and the fingerprint identification processing sub-unit of the pressure sensing assembly are arranged on the driving IC.

In a possible embodiment of the present disclosure, the display substrate includes a plurality of light-emitting elements arranged on a base substrate and corresponding to a plurality of sub-pixels respectively, and a pressure sensing sub-unit arranged on the base substrate. In the case that a pressure sensing module of the pressure sensing sub-unit includes a pressure sensing sub-module and a pressure sensing switching sub-module, the pressure sensing sub-module is arranged in a gap between two adjacent light-emitting elements of a pixel unit, and a pressure sensing switching transistor of the pressure sensing switching sub-module is arranged on the base substrate. In the case that a fingerprint identification module of the pressure sensing sub-unit includes a photosensitive element and a fingerprint identification switching sub-module, the photosensitive element is arranged in a gap between two adjacent pixel units, and a fingerprint identification switching transistor of the fingerprint identification switching sub-module is also arranged on the base substrate.

In a possible embodiment of the present disclosure, the pressure sensing sub-module is arranged between the base substrate and the pressure sensing switching sub-module. An orthogonal projection of the pressure sensing sub-module onto the base substrate is overlapped with an orthogonal projection of the pressure sensing switching transistor of the pressure sensing switching sub-module onto the base substrate. The photosensitive element is arranged between the base substrate and the fingerprint identification switching sub-module. An orthogonal projection of the photosensitive element onto the base substrate is overlapped with an orthogonal projection of the fingerprint identification switching transistor of the fingerprint identification switching sub-module onto the base substrate.

In a possible embodiment of the present disclosure, the display substrate is provided with an opening between any two adjacent pixel units, and a light reflection layer is arranged on the base substrate at a position corresponding to the opening, so as to reflect an external light beam to the photosensitive element.

In a possible embodiment of the present disclosure, the base substrate is further provided with a driving transistor for driving the light-emitting element to emit light. Each layer of the driving transistor is arranged at a level identical to a corresponding layer of the pressure sensing switching transistor and a corresponding layer of the fingerprint identification switching transistor.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors (TFTs), field effect transistors (FETs) or any other elements having an identical characteristic. In order to differentiate two electrodes other than a gate electrode from each other, one of them is called as first electrode and the other is called as second electrode. In actual use, the first electrode may be a drain electrode and the second electrode may be a source electrode, or the first electrode may be a source electrode and the second electrode may be a drain electrode.

Figure 1:
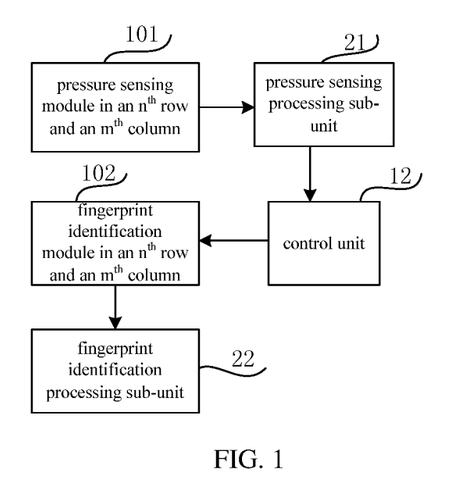
FIG. 1 is a schematic view showing a pressure sensing assembly integrated with a fingerprint identification function according to one embodiment of the present disclosure.

As shown in FIG. 1, the present disclosure provides in some embodiments a pressure sensing assembly integrated with a fingerprint identification function, which includes a pressure sensing unit and a control unit 12. The pressure sensing unit includes a plurality of pressure sensing sub-units arranged in N rows and M columns, a pressure sensing processing sub-unit 21, and a fingerprint identification processing sub-unit 22, where N and M are each a positive integer.

A pressure sensing sub-unit in an $n^{th}$ row and an $m^{th}$ column includes a pressure sensing module 101 in the $n^{th}$ row and the $m^{th}$ column and a fingerprint identification module 102 in the $n^{th}$ row and the $m^{th}$ column (FIG. 1 merely shows the pressure sensing module 101 in the $n^{th}$ row and the $m^{th}$ column and the fingerprint identification module 102 in the $n^{th}$ row and the $m^{th}$ column, and in actual use, the pressure sensing unit includes the pressure sensing sub-units arranged in N rows and M columns). The pressure sensing processing sub-unit 21 and the fingerprint identification module 102 in the $n^{th}$ row and the $m^{th}$ column are connected to the control unit 12, where n is a positive integer smaller than or equal to N, and m is a positive integer smaller than or equal to M.

The pressure sensing module 101 in the $n^{th}$ row and the $m^{th}$ column is configured to output a pressure sensing electrical signal corresponding to a pressure applied thereto.

The pressure sensing processing sub-unit 21 is configured to, in the case that it is detected in accordance with the pressure sensing electrical signal that the pressure sensing module 101 in the $n^{th}$ row and the $m^{th}$ column has been pressed, output a pressure sensing indication signal to the control unit 12.

The control unit 12 is configured to, upon the receipt of the pressure sensing indication signal, transmit a fingerprint identification control signal to the fingerprint identification module 102 in the $n^{th}$ row and the $m^{th}$ column.

The fingerprint identification module 102 in the $n^{th}$ row and the $m^{th}$ column is configured to, upon the receipt of the fingerprint identification control signal, convert a received optical signal into a corresponding fingerprint identification electrical signal.

The fingerprint identification processing sub-unit 22 is configured to perform fingerprint identification in accordance with the fingerprint identification electrical signal.

In FIG. 1, the pressure sensing processing sub-unit 21 is connected to the pressure sensing module 101 in the $n^{th}$ row and the $m^{th}$ column and the control unit 12, and the fingerprint identification processing sub-unit 22 is connected to the control unit 12 and the fingerprint identification module 102 in the $n^{th}$ row and the $m^{th}$ column.

In the pressure sensing assembly integrated with the fingerprint identification function according to the embodiments of the present disclosure, the fingerprint identification processing sub-unit 22 is connected to all the pressure sensing sub-units in N rows and M columns, and the pressure sensing processing sub-unit 21 is connected to all the pressure sensing sub-units in N rows and M columns.

The pressure sensing assembly integrated with the fingerprint identification function in the embodiments of the present disclosure includes the control unit and the pressure sensing unit. The pressure sensing unit includes the pressure sensing sub-units arranged in rows and columns. Each pressure sensing sub-unit includes the pressure sensing module and the fingerprint identification module. The fingerprint identification module is started by the control unit to perform the fingerprint identification merely in the case that the pressure sensing module is pressed. As a result, it is able to prevent the fingerprint identification module from operating in the case that it is unnecessary to perform the fingerprint identification, reduce the power consumption, shield unnecessary signal interference and prevent the occurrence of an unnecessary noise due to such factors as circuit coupling, thereby to prevent a display effect from being adversely affected.

Usually, in the case that a mobile terminal is being used, the pressure sensing module and the fingerprint identification module may not be used, i.e., a touch function and a display function are used more frequently. In the embodiments of the present disclosure, the pressure sensing assembly integrated with the fingerprint identification function is started merely in the case that a pressure has been detected, so as to reduce the power consumption and prevent the signal interference.

To be specific, the pressure sensing assembly further includes a plurality of pressure sensing gate lines arranged in N rows and a plurality of pressure sensing read lines arranged in M columns. The pressure sensing read lines in M columns are connected to the pressure sensing processing sub-unit. Pressure sensing modules in the $n^{th}$ row are connected to an $n^{th}$ pressure sensing gate line, and pressure sensing modules in the $m^{th}$ column are connected to an $m^{th}$ pressure sensing read line.

Figure 2:
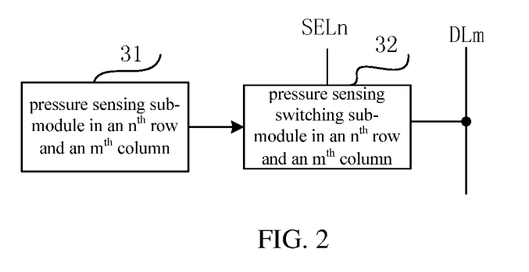
FIG. 2 is a schematic view showing a pressure sensing module in an $n^{th}$ row and an $m^{th}$ column of the pressure sensing assembly according to one embodiment of the present disclosure.

As shown in FIG. 2, the pressure sensing module in the $n^{th}$ row and the $m^{th}$ column may include a pressure sensing sub-module 31 in the $n^{th}$ row and the $m^{th}$ column and a pressure sensing switching sub-module 32 in the $n^{th}$ row and the $m^{th}$ column.

A control end of the pressure sensing switching sub-module 32 in the $n^{th}$ row and the $m^{th}$ column is connected to the $n^{th}$ pressure sensing gate line SELn, a first end thereof is connected to a pressure sensing electrical signal output end of the pressure sensing sub-module 31 in the $n^{th}$ row and the $m^{th}$ column, and a second end thereof is connected to the $m^{th}$ pressure sensing read line DLm.

The pressure sensing sub-module 31 in the $n^{th}$ row and the $m^{th}$ column is configured to convert a pressure applied thereto into a corresponding pressure sensing electrical signal.

The pressure sensing switching sub-module 32 in the $n^{th}$ row and the $m^{th}$ column is configured to control whether or not the pressure sensing electrical signal output end of the pressure sensing sub-module 31 in the $n^{th}$ row and the $m^{th}$ column is to be connected to the $m^{th}$ pressure sensing read line DLm under the control of the $n^{th}$ pressure sensing gate line SELn.

In actual use, the pressure sensing sub-module in the $n^{th}$ row and the $m^{th}$ column may include any pressure sensor capable of converting the pressure applied thereto into a corresponding pressure sensing electrical signal. The following description is given in the case that the pressure sensing sub-module includes a pressure resistance sensor or a piezoelectric sensor. Of course, any other appropriate sensor may be selected in accordance with the practical need, which will not be particularly defined herein.

To be specific, the pressure sensing sub-module in the $n^{th}$ row and the $m^{th}$ column may include a first electrode, a second electrode and a pressure sensing layer arranged between the first electrode and the second electrode. The first electrode is connected to a first level input end. The first end of the pressure sensing sub-module in the $n^{th}$ row and the $m^{th}$ column is connected to the second electrode.

In actual use, the first level input end may be a power source voltage input end for inputting a power source voltage Vcc, or any other direct current (DC) level input end.

During the implementation, the pressure sensing sub-module in the $n^{th}$ row and the $m^{th}$ column may include the first electrode, the second electrode and the pressure sensing layer arranged between the first electrode and the second electrode. The pressure sensing module in the $n^{th}$ row and the $m^{th}$ column may further include a pressure sensing control sub-module in the $n^{th}$ row and the $m^{th}$ column. The first electrode is connected to the first level input end. The first end of the pressure sensing switching sub-module in the $n^{th}$ row and the $m^{th}$ column is connected to the second electrode (i.e., the pressure sensing electrical signal output end of the pressure sensing sub-module).

To be specific, the pressure sensing switching sub-module in the $n^{th}$ row and the $m^{th}$ column may include a pressure sensing switching transistor in the $n^{th}$ row and the $m^{th}$ column, a gate electrode of which is connected to the $n^{th}$ pressure sensing gate line, a first electrode of which is connected to the second electrode, and a second electrode of which is connected to the $m^{th}$ pressure sensing read line.

In actual use, the pressure sensing switching transistor in the $n^{th}$ row and the $m^{th}$ column may be an n-type transistor or a p-type transistor.

In actual use, the pressure sensing layer may include a pressure resistance sensing layer or a piezoelectric sensing layer.

In a possible embodiment of the present disclosure, the pressure sensing layer includes the pressure resistance sensing layer, and the second electrode is further connected to a second level input end. In the case that a pressure is applied onto the pressure resistance sensing layer, a resistance of the pressure resistance sensing layer may change. At this time, a first level (e.g., the power source voltage) is applied to the first electrode and a second level (e.g., a voltage of zero) is applied to the second electrode. In the case that Tnm is in an ON state, the $m^{th}$ pressure sensing read line DLm may acquire a pressure sensing current signal corresponding to a magnitude of the pressure applied to the pressure resistance sensing layer, and transmit the pressure sensing current signal to the pressure sensing processing sub-unit.

During the implementation, the second level input end may be a ground end, or any other direct current (DC) level input end.

In actual use, in the case that the pressure sensing layer includes the pressure resistance sensing layer, the $m^{th}$ pressure sensing read line DLm may also acquire a pressure sensing voltage signal corresponding to the magnitude of the pressure applied to the pressure resistance sensing layer, and sense the pressure in accordance with the pressure sensing voltage signal.

To be specific, in the case that the pressure sensing layer includes the pressure resistance sensing layer, the pressure sensing module in the $n^{th}$ row and the $m^{th}$ column may further include a resistor sub-module in the $n^{th}$ row and the $m^{th}$ column, the second electrode of the pressure sensing sub-module in the $n^{th}$ row and the $m^{th}$ column is connected to the second level input end via the resistor sub-module in the $n^{th}$ row and the $m^{th}$ column, and the resistor sub-module in the $n^{th}$ row and the $m^{th}$ column has a constant resistance. In this way, the pressure sensing switching sub-module in the $n^{th}$ row and the $m^{th}$ column including the pressure resistance sensing layer may form a bleeder circuit with the resistor sub-module in the $n^{th}$ row and the $m^{th}$ column. In the case that the pressure resistance sensing layer of the pressure sensing switching sub-module in the $n^{th}$ row and the $m^{th}$ column is pressed, a resistance of the pressure sensing switching sub-module in the $n^{th}$ row and the $m^{th}$ column may change, and thereby a voltage applied to the second electrode of the pressure sensing switching sub-module in the $n^{th}$ row and the $m^{th}$ column may change too. In the case that the pressure sensing switching transistor in the $n^{th}$ row and the $m^{th}$ column is in the ON state, the $m^{th}$ pressure sensing read line may read the pressure sensing voltage corresponding to the magnitude of the pressure applied to the pressure resistance sensing layer of the pressure sensing switching sub-module in the $n^{th}$ row and the $m^{th}$ column, and then the pressure may be detected in accordance with the pressure sensing voltage signal.

In actual use, the resistor sub-module in the $n^{th}$ row and the $m^{th}$ column may include a normally-ON transistor in the $n^{th}$ row and the $m^{th}$ column, a gate electrode of which is connected to a first voltage input end, a first electrode of which is connected to the second electrode of the pressure sensing sub-module in the $n^{th}$ row and the $m^{th}$ column, and a second electrode of which is connected to the second level input end. The normally-ON transistor in the $n^{th}$ row and the $m^{th}$ column is always in the ON state under the control of the first voltage input end, and it is equivalent to a resistor having a constant resistance. In other words, in the case that the normally-ON transistor in the $n^{th}$ row and the $m^{th}$ column is an n-type transistor, a high voltage is applied via the first voltage input end. In addition, in the case that the normally- ON transistor in the $n^{th}$ row and the $m^{th}$ column is a p-type transistor, a low voltage is applied via the first voltage input end.

In another possible embodiment of the present disclosure, the pressure sensing layer may include the piezoelectric sensing layer. At this time, the second electrode is unnecessary to be connected to the second level input end. In the case that the pressure is applied to the piezoelectric sensing layer, a voltage between the first electrode and the second electrode may change correspondingly, and thereby a potential at the second electrode may change too. For example, in the case that Tnm is in the ON state, the $m^{th}$ pressure sensing read line DLm may acquire the pressure sensing voltage signal corresponding to the magnitude of the pressure applied to the piezoelectric sensing layer, and transmit the pressure sensing voltage signal to the pressure sensing processing sub-unit.

Figure 3:
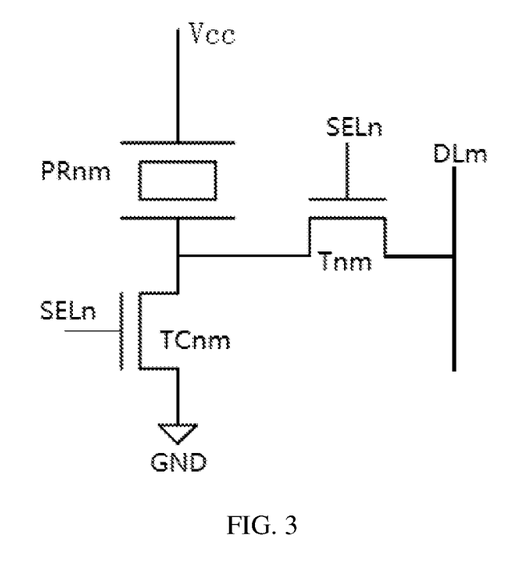
FIG. 3 is a circuit diagram of the pressure sensing module in the $n^{th}$ row and the $m^{th}$ column of the pressure sensing assembly according to one embodiment of the present disclosure.

As shown in FIG. 3, in the pressure sensing assembly integrated with the fingerprint identification function, the pressure sensing module in the $n^{th}$ row and the $m^{th}$ column include the pressure resistance sensor PRnm in the $n^{th}$ row and the $m^{th}$ column, the pressure sensing switching transistor Tnm in the $n^{th}$ row and the $m^{th}$ column and the normally-ON transistor TCnm in the $n^{th}$ row and the $m^{th}$ column.

The first electrode of the pressure resistance sensor PRnm is connected to the power source voltage input end for inputting the power source voltage Vcc, and the second electrode thereof is connected to a drain electrode of the pressure sensing switching transistor Tnm in the $n^{th}$ row and the $m^{th}$ column and a source electrode of the normally-ON transistor TCnm in the $n^{th}$ row and the $m^{th}$ column respectively.

A gate electrode of the pressure sensing switching transistor Tnm in the $n^{th}$ row and the $m^{th}$ column is connected to the $n^{th}$ pressure sensing gate line SELn.

A gate electrode of the normally-ON transistor TCnm in the $n^{th}$ row and the $m^{th}$ column is connected to a high voltage input end for inputting a high voltage Vdd, so that TCnm is always in the ON state. As a result, TCnm is equivalent to a resistor having a constant resistance.

A source electrode of the pressure sensing switching transistor Tnm is connected to the $m^{th}$ pressure sensing read line DLm, and a drain electrode of the normally-ON transistor TCnm in the $n^{th}$ row and the $m^{th}$ column is connected to the ground end GND.

In FIG. 3, both Tnm and TCnm are n-type transistors. However, in actual use, Tnm and TCnm may also be p-type transistors.

During the operation of the pressure sensing module in the $n^{th}$ row and the $m^{th}$ column in FIG. 3, TCnm is always in the ON state, and it is equivalent to a resistor having a constant resistance. PRnm and TCnm form a bleeder circuit. In the case that SELn outputs a high level, Tnm is in the ON state, and a second end of PRnm is connected to DLm. At this time, DLm may acquire the pressure sensing voltage signal corresponding to the magnitude of the pressure applied to PRnm, and transmit the pressure sensing voltage signal to the pressure sensing processing sub-unit.

Figure 4:
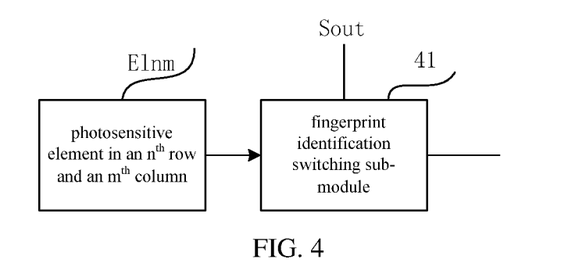
FIG. 4 is a schematic view showing a fingerprint identification module in the $n^{th}$ row and the $m^{th}$ column of the pressure sensing assembly according to one embodiment of the present disclosure.

To be specific, as shown in FIG. 4, the fingerprint identification module in the $n^{th}$ row and the $m^{th}$ column includes a photosensitive element ELnm in the $n^{th}$ row and the $m^{th}$ column and a fingerprint identification switching sub-module 41 in the $n^{th}$ row and the $m^{th}$ column.

The photosensitive element ELnm in the $n^{th}$ row and the $m^{th}$ column is configured to convert the received optical signal into the corresponding fingerprint identification electrical signal.

A control end of the fingerprint identification switching sub-module 41 in the $n^{th}$ row and the $m^{th}$ column is connected to a fingerprint identification control signal output end Sout of the control unit (not shown), a first end thereof is connected to a fingerprint identification electrical signal output end of the photosensitive element ELnm in the $n^{th}$ row and the $m^{th}$ column, and a second end thereof is connected to the fingerprint identification processing sub-unit (not shown).

The fingerprint identification switching sub-module 41 in the $n^{th}$ row and the $m^{th}$ column is configured to, in the case that its control end has received the pressure sensing indication signal from the control unit (not shown), control the fingerprint identification electrical signal output end of the photosensitive element ELnm in the $n^{th}$ row and the $m^{th}$ column to be connected to the fingerprint identification processing sub-unit (not shown).

To be specific, the fingerprint identification switching sub-module in the $n^{th}$ row and the $m^{th}$ column may include a fingerprint identification switching transistor in the $n^{th}$ row and the $m^{th}$ column, a gate electrode of which is connected to the pressure sensing indication signal output end of the control unit, a first electrode of which is connected to the fingerprint identification electrical signal output end of the photosensitive element in the $n^{th}$ row and the $m^{th}$ column, and a second electrode of which is connected to the fingerprint identification processing sub-unit.

In actual use, the fingerprint identification switching transistor in the $n^{th}$ row and the $m^{th}$ column may be an n-type transistor or a p-type transistor.

During the implementation, the photosensitive element may include a photodiode, or any other element capable of converting the received optical signal into a corresponding electrical signal.

Figure 5:
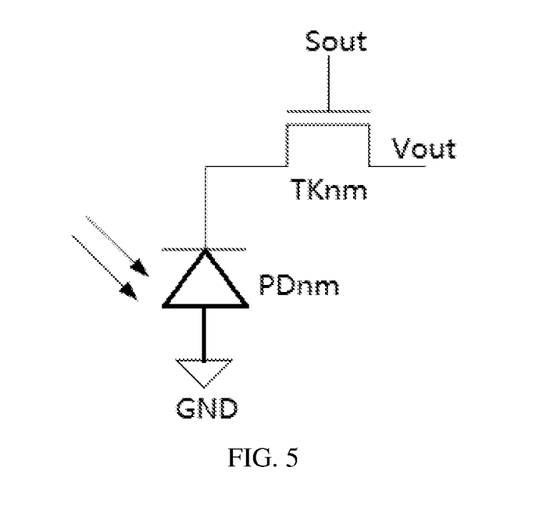
FIG. 5 is a circuit diagram of the fingerprint identification module in the $n^{th}$ row and the $m^{th}$ column of the pressure sensing assembly according to one embodiment of the present disclosure.

As shown in FIG. 5, in a possible embodiment of the present disclosure, the fingerprint identification module in the $n^{th}$ row and the $m^{th}$ column includes a photodiode PDnm in the $n^{th}$ row and the $m^{th}$ column and a fingerprint identification switching transistor TKnm, An anode of PDnm is connected to the ground end GND. PDnm is configured to convert the received optical signal into the electrical signal. A cathode of PDnm is connected to a drain electrode of TKnm, a gate electrode thereof is connected to the fingerprint identification control signal output end Sout of the control unit, and a source electrode thereof is connected to an output end Vout of the fingerprint identification module in the $n^{th}$ row and the $m^{th}$ column. The output end Vout is connected to the fingerprint identification processing sub-unit (not shown).

In actual use, PDnm is in a reversely-biased state. In the case that the photodiode is in the reversely-biased state, there is a linear relationship between the received optical signal and a current signal outputted therefrom. Hence, during the fingerprint identification, usually the photodiode is configured in the reversely-biased state.

The present disclosure further provides in some embodiments a method for driving the above-mentioned pressure sensing module integrated with the fingerprint identification function, which includes steps of: outputting, by the pressure sensing module in the $n^{th}$ row and the $m^{th}$ column, a pressure sensing electrical signal corresponding to a pressure applied thereto to the pressure sensing processing sub-unit; in the case that the pressure sensing processing sub-unit has detected in accordance with the pressure sensing electrical signal that the pressure sensing module in the $n^{th}$ row and the $m^{th}$ column has been pressed, outputting, by the pressure sensing processing sub-unit, a pressure sensing indication signal to the control unit; upon the receipt of the pressure sensing indication signal, transmitting, by the control unit, a fingerprint identification control signal to the fingerprint identification module in the $n^{th}$ row and the $m^{th}$ column; upon the receipt of the fingerprint identification control signal, converting, by the fingerprint identification module in the $n^{th}$ row and the $m^{th}$ column, a received optical signal into a corresponding fingerprint identification electrical signal, and transmitting the fingerprint identification electrical signal to the fingerprint identification processing sub-unit; and performing, by the fingerprint identification processing sub-unit, fingerprint identification in accordance with the fingerprint identification electrical signal.

According to the method in the embodiments of the present disclosure, the fingerprint identification module is started by the control unit merely in the case that the pressure sensing module is pressed. As a result, it is able to prevent the fingerprint identification module from operating in the case that it is unnecessary to perform the fingerprint identification, reduce the power consumption, shield unnecessary signal interference and prevent the occurrence of an unnecessary noise due to such factors as circuit coupling, thereby to prevent a display effect from being adversely affected.

The present disclosure further provides in some embodiments a display device including the above-mentioned pressure sensing assembly integrated with the fingerprint identification function.

To be specific, the display device further includes a display substrate and a driving IC. The pressure sensing sub-units in N rows and M columns of the pressure sensing unit of the pressure sensing assembly are arranged in the display substrate, where N and M are each a positive integer. The control unit, the pressure sensing processing sub-unit and the fingerprint identification processing sub-unit of the pressure sensing assembly are arranged on the driving IC.

In actual use, the pressure sensing sub-units of the pressure sensing assembly may be arranged in the display substrate, and the control unit, the pressure sensing processing sub-unit and the fingerprint identification processing sub-unit may be arranged in the driving IC.

To be specific, the display substrate includes a plurality of light-emitting elements arranged on a base substrate and corresponding to a plurality of sub-pixels respectively, and a pressure sensing sub-unit arranged on the base substrate.

In the case that a pressure sensing module of the pressure sensing sub-unit includes a pressure sensing sub-module and a pressure sensing switching sub-module, the pressure sensing sub-module is arranged in a gap between two adjacent light-emitting elements of a pixel unit, and a pressure sensing switching transistor of the pressure sensing switching sub-module is arranged on the base substrate.

In the case that a fingerprint identification module of the pressure sensing sub-unit includes a photosensitive element and a fingerprint identification switching sub-module, the photosensitive element is arranged in a gap between two adjacent pixel units, and a fingerprint identification switching transistor of the fingerprint identification switching sub-module is also arranged on the base substrate.

To be specific, the pressure sensing sub-module may be arranged between the base substrate and the pressure sensing switching sub-module. An orthogonal projection of the pressure sensing sub-module onto the base substrate may be overlapped with an orthogonal projection of the pressure sensing switching transistor of the pressure sensing switching sub-module onto the base substrate.

The photosensitive element may be arranged between the base substrate and the fingerprint identification switching sub-module. An orthogonal projection of the photosensitive element onto the base substrate may be overlapped with an orthogonal projection of the fingerprint identification switching transistor of the fingerprint identification switching sub-module onto the base substrate.

During the implementation, the display substrate is provided with an opening between any two adjacent pixel units, and a light reflection layer is arranged on the base substrate at a position corresponding to the opening, so as to reflect an external light beam to the photosensitive element.

In actual use, the base substrate is further provided with a driving transistor for driving the light-emitting element to emit light.

In a possible embodiment of the present disclosure, each layer of the driving transistor is arranged at a level identical to a corresponding layer of the pressure sensing switching transistor and a corresponding layer of the fingerprint identification switching transistor.

In the embodiments of the present disclosure, in the case that each layer of the driving transistor is arranged at a level identical to a corresponding layer of the pressure sensing switching transistor and a corresponding layer of the fingerprint identification switching transistor, it is able to form the layers of the driving transistor, the pressure sensing switching transistor and the fingerprint identification switching transistor through an identical patterning process, without any additional patterning process.

Figure 6:
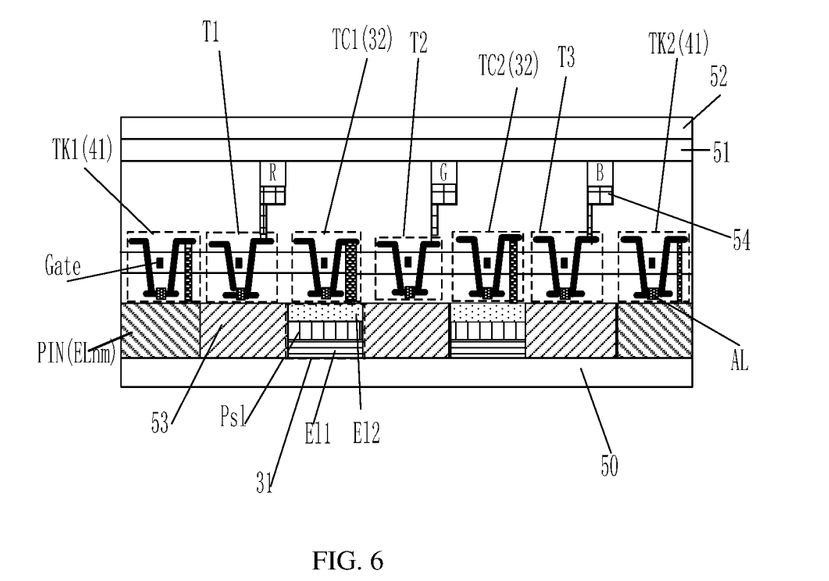
FIG. 6 is a schematic view showing a display device according to one embodiment of the present disclosure.

FIG. 6 shows the display device according to one embodiment of the present disclosure.

In FIG. 6, 50 represents the base substrate, PIN (ELnm) represents the photodiode (the photosensitive element ELnm may include the photodiode PIN (ELnm)), Ps1 represents the pressure sensing layer, E11 represents the first electrode, E12 represents the second electrode (in actual use, the pressure sensing sub-module 31 in the $n^{th}$ row and the $m^{th}$ column may include the first electrode E11, the second electrode E12 and the pressure sensing layer Ps1 between the first electrode E11 and the second electrode E12), 53 represents an insulation layer, AL represents an active layer, TK1 (41) represents a first fingerprint identification switching transistor (the fingerprint identification switching sub-module 41 in the $n^{th}$ row and the $m^{th}$ column includes the first fingerprint identification switching transistor TK1 (41)), T1 represents a first driving transistor, TC1 (32) represents a first pressure sensing switching transistor (the pressure sensing switching sub-module 32 in the $n^{th}$ row and the $m^{th}$ column includes the first driving transistor, TC1 (32)), T2 represents a second driving transistor, TC2 (32) represents a second pressure sensing switching transistor (the pressure sensing switching sub-module 32 in the $n^{th}$ row and the $m^{th}$ column includes the second pressure sensing switching transistor TC2 (32)), T3 represents a third driving transistor, TK2 (41) represents a second fingerprint identification switching transistor (the fingerprint identification switching sub-module 41 includes the second fingerprint identification switching transistor TK2 (41)), 51 represents a cathode, 52 represents a package thin film, 54 represents an anode, R represents a red Organic Light-Emitting Diode (OLED) layer, G represents a green OLED layer, B represents a blue OLED layer, and Gate represents a gate electrode.

In actual use, the photodiode for identifying a fingerprint optically and the pressure sensing sub-module for sensing a pressure may be formed under a thin film transistor array layer. The pressure sensing sub-module includes the first electrode E11, the second electrode E12, and the pressure sensing layer Ps1 between the first electrode E11 and the second electrode E12. The pressure sensing sub-module is arranged in a gap between two adjacent light-emitting elements of a pixel unit, and the photodiode PIN is arranged in a gap between two adjacent pixel units.

In the case that the OLED emits light and a display screen is pressed by a finger, a pressure may be applied to the pressure sensing layer Ps1, so as to generate the pressure sensing electrical signal. A position where the pressure is applied may be determined in accordance with the pressure sensing electrical signal. In addition, the corresponding photodiode PIN may collect an optical signal under the control of the control unit, and then the optical signal may be converted into a corresponding electrical signal. The light is reflected by ridges and valleys of the fingerprint in different manners, so the photodiode PIN may receive different optical signals. In this way, it is able to determine the ridges and valleys of the fingerprint. Hence, it is able to effectively reduce the power consumption of the fingerprint identification IC, and prevent the unnecessary signal interference.

Figure 7:
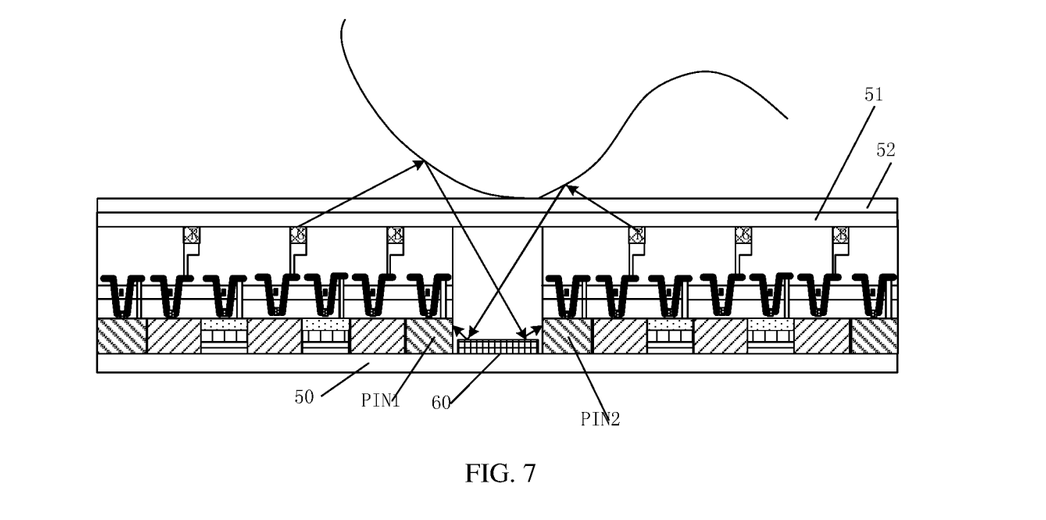
FIG. 7 is another schematic view showing the display device according to one embodiment of the present disclosure.

In actual use, as shown in FIG. 7, the display substrate is provided with the opening between any two adjacent pixel units (FIG. 6 shows structures of the pixel unit on the left and the pixel unit on the right), and the light reflection layer 60 is arranged on the base substrate 50 at a position corresponding to the opening, so as to reflect the external light beam to the first photodiode PIN1 and the second photodiode PIN2. Through the light reflection layer 60 on the base substrate at the position corresponding to the opening, it is able to prolong an optical path, thereby to facilitate the operation.

During the implementation, the cathode 51 and the package thin film 52 are arranged above the light reflection layer 60 on the base substrate 50 at the position corresponding to the opening. The light reflection layer may be made of metal or any other material capable of reflecting the light, which will not be particularly defined herein.

According to the display device in the embodiments of the present disclosure, the corresponding layers of the pressure sensing switching transistor, the driving transistor and the fingerprint identification switching transistor are located at an identical level, so it is able to form the layers through an identical patterning process without any additional patterning process, thereby to remarkably reduce the manufacture cost and the manufacture difficulty.

The display device may be any product or member having a display function, such as mobile phone, flat-panel computer, television, display, laptop computer, a digital photo frame or navigator.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pressure sensing assembly integrated with a fingerprint identification function, comprising a pressure sensing unit and a control unit, wherein:
   the pressure sensing unit comprises a plurality of pressure sensing sub-units arranged in N rows and M columns, a pressure sensing processing sub-unit, and a fingerprint identification processing sub-unit, where N and M are each a positive integer;
   a pressure sensing sub-unit in an $n^{th}$ row and an $m^{th}$ column comprises a pressure sensing module in the $n^{th}$ row and the $m^{th}$ column and a fingerprint identification module in the $n^{th}$ row and the $m^{th}$ column, where n is a positive integer smaller than or equal to N, and m is a positive integer smaller than or equal to M;
   the pressure sensing processing sub-unit and the fingerprint identification module in the $n^{th}$ row and the $m^{th}$ column are connected to the control unit;
   the pressure sensing module in the $n^{th}$ row and the $m^{th}$ column is configured to output a pressure sensing electrical signal corresponding to a pressure applied thereto;
   the pressure sensing processing sub-unit is configured to, upon detecting in accordance with the pressure sensing electrical signal that the pressure sensing module in the $n^{th}$ row and the $m^{th}$ column has been pressed, output a pressure sensing indication signal to the control unit;
   the control unit is configured to, upon the receipt of the pressure sensing indication signal, transmit a fingerprint identification control signal to the fingerprint identification module in the $n^{th}$ row and the $m^{th}$ column;
   the fingerprint identification module in the $n^{th}$ row and the $m^{th}$ column is configured to, upon the receipt of the fingerprint identification control signal, convert a received optical signal into a corresponding fingerprint identification electrical signal; and
   the fingerprint identification processing sub-unit is configured to perform fingerprint identification in accordance with the fingerprint identification electrical signal.

2. The pressure sensing assembly according to claim 1, further comprising a plurality of pressure sensing gate lines arranged in N rows and a plurality of pressure sensing read lines arranged in M columns, wherein:
   the pressure sensing read lines in M columns are connected to the pressure sensing processing sub-unit;
   pressure sensing modules in the $n^{th}$ row are connected to an $n^{th}$ pressure sensing gate line, and pressure sensing modules in the $m^{th}$ column are connected to an $m^{th}$ pressure sensing read line;
   the pressure sensing module in the $n^{th}$ row and the $m^{th}$ column comprises a pressure sensing sub-module in the $n^{th}$ row and the $m^{th}$ column and a pressure sensing switching sub-module in the $n^{th}$ row and the $m^{th}$ column;
   a control end of the pressure sensing switching sub-module in the $n^{th}$ row and the $m^{th}$ column is connected to the $n^{th}$ pressure sensing gate line, a first end thereof is connected to a pressure sensing electrical signal output end of the pressure sensing sub-module in the $n^{th}$ row and the $m^{th}$ column, and a second end thereof is connected to the $m^{th}$ pressure sensing read line;
   the pressure sensing sub-module in the $n^{th}$ row and the $m^{th}$ column is configured to convert a pressure applied thereto into a corresponding pressure sensing electrical signal; and
   the pressure sensing switching sub-module in the $n^{th}$ row and the $m^{th}$ column is configured to control whether or not the pressure sensing electrical signal output end of the pressure sensing sub-module in the $n^{th}$ row and the $m^{th}$ column is to be connected to the $m^{th}$ pressure sensing read line under control of the $n^{th}$ pressure sensing gate line.

3. The pressure sensing assembly according to claim 2, wherein the pressure sensing sub-module in the $n^{th}$ row and the $m^{th}$ column comprises a first electrode, a second electrode and a pressure sensing layer arranged between the first electrode and the second electrode;

the first electrode is connected to a first level input end; and a first end of the pressure sensing sub-module in the $n^{th}$ row and the $m^{th}$ column is connected to the second electrode.

4. The pressure sensing assembly according to claim 3, wherein the pressure sensing switching sub-module in the $n^{th}$ row and the $m^{th}$ column comprises a pressure sensing switching transistor in the $n^{th}$ row and the $m^{th}$ column, a gate electrode of which is connected to the $n^{th}$ pressure sensing gate line, a first electrode of which is connected to the second electrode, and a second electrode of which is connected to the $m^{th}$ pressure sensing read line.

5. The pressure sensing assembly according to claim 4, wherein the pressure sensing layer comprises a pressure resistance sensing layer, and the second electrode is further connected to a second level input end.

6. The pressure sensing assembly according to claim 5, wherein the pressure sensing module in the $n^{th}$ row and the $m^{th}$ column further comprises a resistor sub-module in the $n^{th}$ row and the $m^{th}$ column, the second electrode of the pressure sensing sub-module in the $n^{th}$ row and the $m^{th}$ column is connected to the second level input end via the resistor sub-module in the $n^{th}$ row and the $m^{th}$ column, and the resistor sub-module in the $n^{th}$ row and the $m^{th}$ column has a constant resistance.

7. The pressure sensing assembly according to claim 6, wherein the resistor sub-module in the $n^{th}$ row and the $m^{th}$ column comprises a normally-ON transistor in the $n^{th}$ row and the $m^{th}$ column, a gate electrode of which is connected to a first voltage input end, a first electrode of which is connected to the second electrode of the pressure sensing sub-module in the $n^{th}$ row and the $m^{th}$ column, and a second electrode of which is connected to the second level input end.

8. The pressure sensing assembly according to claim 4, wherein the pressure sensing layer comprises a piezoelectric sensing layer.

9. The pressure sensing assembly according to claim 1, wherein the fingerprint identification module in the $n^{th}$ row and the $m^{th}$ column comprises a photosensitive element in the $n^{th}$ row and the $m^{th}$ column and a fingerprint identification switching sub-module in the $n^{th}$ row and the $m^{th}$ column;

the photosensitive element in the $n^{th}$ row and the $m^{th}$ column is configured to convert the received optical signal into the corresponding fingerprint identification electrical signal;

a control end of the fingerprint identification switching sub-module in the $n^{th}$ row and the $m^{th}$ column is connected to a fingerprint identification control signal output end of the control unit, a first end thereof is connected to a fingerprint identification electrical signal output end of the photosensitive element in the $n^{th}$ row and the $m^{th}$ column, and a second end thereof is connected to the fingerprint identification processing sub-unit; and the fingerprint identification switching sub-module in the $n^{th}$ row and the $m^{th}$ column is configured to, upon its control end having received the pressure sensing indication signal from the control unit, control the fingerprint identification electrical signal output end of the photosensitive element in the $n^{th}$ row and the $m^{th}$ column to be connected to the fingerprint identification processing sub-unit.

10. The pressure sensing assembly according to claim 9, wherein the fingerprint identification switching sub-module in the $n^{th}$ row and the $m^{th}$ column comprises a fingerprint identification switching transistor in the $n^{th}$ row and the $m^{th}$ column, a gate electrode of which is connected to the pressure sensing indication signal output end of the control unit, a first electrode of which is connected to the fingerprint identification electrical signal output end of the photosensitive element in the $n^{th}$ row and the $m^{th}$ column, and a second electrode of which is connected to the fingerprint identification processing sub-unit.

11. A method for driving the pressure sensing assembly according to claim 1, comprising:

outputting, by the pressure sensing module in the $n^{th}$ row and the $m^{th}$ column, a pressure sensing electrical signal corresponding to a pressure applied thereto to the pressure sensing processing sub-unit;

upon the pressure sensing processing sub-unit detecting in accordance with the pressure sensing electrical signal that the pressure sensing module in the $n^{th}$ row and the $m^{th}$ column has been pressed, outputting, by the pressure sensing processing sub-unit, a pressure sensing indication signal to the control unit;

upon the receipt of the pressure sensing indication signal, transmitting, by the control unit, a fingerprint identification control signal to the fingerprint identification module in the $n^{th}$ row and the $m^{th}$ column;

upon the receipt of the fingerprint identification control signal, converting, by the fingerprint identification module in the $n^{th}$ row and the $m^{th}$ column, a received optical signal into a corresponding fingerprint identification electrical signal, and transmitting the fingerprint identification electrical signal to the fingerprint identification processing sub-unit; and performing, by the fingerprint identification processing sub-unit, fingerprint identification in accordance with the fingerprint identification electrical signal.

12. A display device, comprising a pressure sensing assembly integrated with a fingerprint identification function, wherein the pressure sensing assembly comprises a pressure sensing unit and a control unit;

the pressure sensing unit comprises a plurality of pressure sensing sub-units arranged in N rows and M columns, a pressure sensing processing sub-unit, and a fingerprint identification processing sub-unit, where N and M are each a positive integer;

a pressure sensing sub-unit in an $n^{th}$ row and an $m^{th}$ column comprises a pressure sensing module in the $n^{th}$ row and the $m^{th}$ column and a fingerprint identification module in the $n^{th}$ row and the $m^{th}$ column;

the pressure sensing processing sub-unit and the fingerprint identification module in the $n^{th}$ row and the $m^{th}$ column are connected to the control unit, where n is a positive integer smaller than or equal to N, and m is a positive integer smaller than or equal to M;

the pressure sensing module in the $n^{th}$ row and the $m^{th}$ column is configured to output a pressure sensing electrical signal corresponding to a pressure applied thereto;

the pressure sensing processing sub-unit is configured to, upon detecting in accordance with the pressure sensing electrical signal that the pressure sensing module in the $n^{th}$ row and the $m^{th}$ column has been pressed, output a pressure sensing indication signal to the control unit;

the control unit is configured to, upon the receipt of the pressure sensing indication signal, transmit a fingerprint identification control signal to the fingerprint identification module in the n$^{th}$ row and the m$^{th}$ column;

the fingerprint identification module in the n$^{th}$ row and the m$^{th}$ column is configured to, upon the receipt of the fingerprint identification control signal, convert a received optical signal into a corresponding fingerprint identification electrical signal; and the fingerprint identification processing sub-unit is configured to perform fingerprint identification in accordance with the fingerprint identification electrical signal.

13. The display device according to claim 12, further comprising a display substrate and a driving Integrated Circuit (IC), wherein the pressure sensing sub-units in N rows and M columns of the pressure sensing unit of the pressure sensing assembly are arranged in the display substrate, where N and M are each a positive integer; and the control unit, the pressure sensing processing sub-unit and the fingerprint identification processing sub-unit of the pressure sensing assembly are arranged on the driving IC.

14. The display device according to claim 13, wherein the display substrate comprises a plurality of light-emitting elements arranged on a base substrate and corresponding to a plurality of sub-pixels respectively, and a pressure sensing sub-unit arranged on the base substrate;

a pressure sensing module of the pressure sensing sub-unit includes a pressure sensing sub-module and a pressure sensing switching sub-module, the pressure sensing sub-module is arranged in a gap between two adjacent light-emitting elements of a pixel unit, and a pressure sensing switching transistor of the pressure sensing switching sub-module is arranged on the base substrate; and a fingerprint identification module of the pressure sensing sub-unit includes a photosensitive element and a fingerprint identification switching sub-module, the photosensitive element is arranged in a gap between two adjacent pixel units, and a fingerprint identification switching transistor of the fingerprint identification switching sub-module is also arranged on the base substrate.

15. The display device according to claim 14, wherein the pressure sensing sub-module is arranged between the base substrate and the pressure sensing switching sub-module;

an orthogonal projection of the pressure sensing sub-module onto the base substrate is overlapped with an orthogonal projection of the pressure sensing switching transistor of the pressure sensing switching sub-module onto the base substrate;

the photosensitive element is arranged between the base substrate and the fingerprint identification switching sub-module; and an orthogonal projection of the photosensitive element onto the base substrate is overlapped with an orthogonal projection of the fingerprint identification switching transistor of the fingerprint identification switching sub-module onto the base substrate.

16. The display device according to claim 14, wherein the display substrate is provided with an opening between any two adjacent pixel units, and a light reflection layer is arranged on the base substrate at a position corresponding to the opening, so as to reflect an external light beam to the photosensitive element.

17. The display device according to claim 14, wherein the base substrate is further provided with a driving transistor for driving the light-emitting element to emit light; and each layer of the driving transistor is arranged at a level identical to a corresponding layer of the pressure sensing switching transistor and a corresponding layer of the fingerprint identification switching transistor.

\* \* \* \* \*